(12) United States Patent
Matthew et al.

(10) Patent No.: US 7,325,696 B2
(45) Date of Patent: Feb. 5, 2008

(54) MULTIPLE PART ADJUSTABLE AUTOMOTIVE CLOTHES ROD ASSEMBLY

(75) Inventors: Norman L. Matthew, Highland Park, IL (US); Vincent Alesi, Bartlett, IL (US)

(73) Assignee: Custom Accessories, Inc., Niles, IL (US)

( * ) Notice: Subject to any disclaimer, the term of this patent is extended or adjusted under 35 U.S.C. 154(b) by 10 days.

(21) Appl. No.: 10/975,513

(22) Filed: Oct. 28, 2004

(65) Prior Publication Data

US 2005/0092795 A1    May 5, 2005

Related U.S. Application Data

(60) Provisional application No. 60/516,092, filed on Oct. 29, 2003.

(51) Int. Cl.
  *A47H 1/08*     (2006.01)
(52) U.S. Cl. ............... 211/105.3; 211/204; 211/206
(58) Field of Classification Search .. 211/105.1–105.6, 211/123, 204, 206; D8/376, 377; 248/214; 16/87.4 R; 403/348, 349, 109.1, 305, 377; 285/377, 302, 314, 358, 359, 394, 401, 362, 285/7
See application file for complete search history.

(56) References Cited

U.S. PATENT DOCUMENTS

| | | | |
|---|---|---|---|
| 2,382,003 A * | 8/1945 | Cones | 211/105.1 |
| 2,520,051 A | 8/1950 | Newland | |
| 2,569,678 A | 10/1951 | Larson et al. | |
| 2,698,094 A | 12/1954 | Simpson | |
| 2,969,881 A | 1/1961 | Lilly | |
| 3,424,314 A | 1/1969 | Cornelsen | |
| 3,467,415 A * | 9/1969 | Bela | 403/59 |
| 3,481,483 A | 12/1969 | Harvey et al. | |
| 4,094,414 A | 6/1978 | Thiot et al. | |
| 4,778,089 A | 10/1988 | White et al. | |
| 4,824,302 A | 4/1989 | Schultheis et al. | |
| 4,895,471 A | 1/1990 | Geltz et al. | |
| 5,099,539 A | 3/1992 | Forester | |
| 5,104,269 A | 4/1992 | Hardison | |
| 5,281,063 A | 1/1994 | Austin, III | |
| 5,626,435 A * | 5/1997 | Wohlhuter | 403/348 |
| 5,697,115 A * | 12/1997 | Sciarra et al. | 15/21.1 |
| 5,702,010 A | 12/1997 | Liang | |
| 5,855,451 A * | 1/1999 | Milton et al. | 403/348 |
| 6,131,749 A | 10/2000 | Crockett et al. | |

(Continued)

*Primary Examiner*—Jennifer E. Novosad
(74) *Attorney, Agent, or Firm*—Patzik, Frank & Samotny Ltd.

(57) ABSTRACT

An adjustable automotive clothes rod assembly having multiple telescoping clothes rod segments that may be securely attached to one another through a T-shaped male member having a pair of wings and a keyhole-shaped female member having a pair of channels for accepting the wings of the male member. Each of the clothing rod segments comprises an outer sleeve and an inner sleeve that is sized to permit it to move in telescopic relation to the outer sleeve. The end of the inner sleeve includes a retaining end member for attaching the clothes rod assembly to the inside of a vehicle. In a preferred embodiment, the retaining end member includes both a loop and a hook for attaching to a hook or a handle of a vehicle, respectively. The inner sleeve also preferably may be selectively secured within the outer sleeve to maintain the clothes rod assembly in either extended or retracted position.

13 Claims, 3 Drawing Sheets

U.S. PATENT DOCUMENTS

| | | | |
|---|---|---|---|
| 6,145,677 A * | 11/2000 | Corniel | 211/105.1 |
| D436,025 S | 1/2001 | Ohm et al. | |
| 6,168,212 B1 | 1/2001 | Finley | |
| 6,322,284 B1 * | 11/2001 | Bonardo et al. | 403/348 |
| 6,336,766 B1 * | 1/2002 | De Villele | 403/348 |
| 6,430,759 B1 * | 8/2002 | Beltran | 4/576.1 |
| D468,193 S | 1/2003 | Ohm et al. | |
| D468,623 S | 1/2003 | Ohm et al. | |

\* cited by examiner

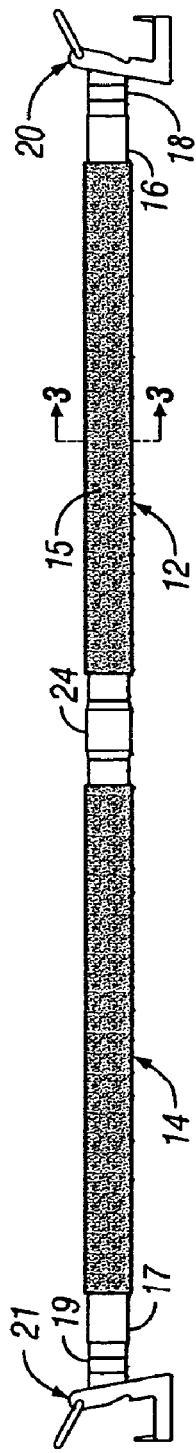
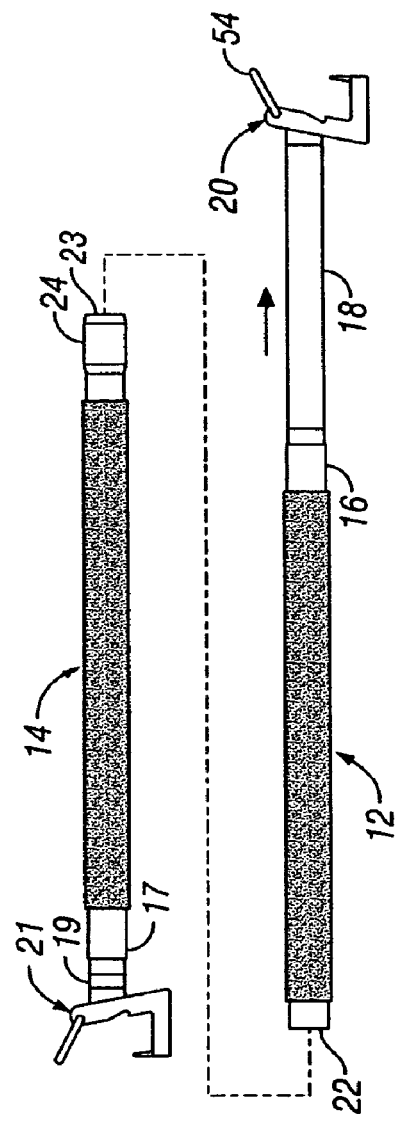
FIG. 1
FIG. 2

MULTIPLE PART ADJUSTABLE AUTOMOTIVE CLOTHES ROD ASSEMBLY

This application claims priority based upon U.S. Provisional Patent Application No. 60/516,092, filed Oct. 29, 2003.

FIELD OF THE INVENTION

This invention relates to clothes rod assemblies in general and, more particularly, to a length-adjustable multi-segment clothes rod assembly that can be disassembled into two or more part to facilitate storage and minimize retail display space.

BACKGROUND OF THE INVENTION

Vehicles today typically include handles or hooks that are located above the rear side windows of the vehicles. While these hooks and handles may be used to hang garments on hangers during travel, the handles and hooks only permit a limited number of articles of clothing to be hung thereupon. Furthermore, clothes that are hung on hangers on the handles or hooks may accidentally get damaged and/or dropped onto the floor or ground upon opening and/or shutting the vehicle door.

It is known to have an automotive clothes rod that may be telescopically adjusted to extend across the backseat of the vehicle because the distance between the opposite ends of the backseat varies with the size and/or model of the vehicle. The known clothes rods generally comprise a long outer tube having a single inner tube or rod that may telescopically be extended to adjust the length of the clothes rods to allow the clothes rods to be attached to the inside of the vehicle above the door openings.

While the known automotive clothes rods may work in many situations, problems have arisen during their use. In particular, because the known clothes rods are comprised of only one telescoping rod segment, the conventional clothes rod in its packaging is somewhat long. Accordingly, the packages for the conventional clothes rods take up more linear shelf space then is necessary and can be inconvenient for the consumer to carry or store. Such clothes rods also are not adapted for attaching to both hooks and handles on vehicles above the backseat doors or windows.

Therefore, there is a need to produce a length-adjustable multi-segment clothes rod assembly that may be disassembled into at least two parts to facilitate storage of the assembly and minimize the amount of retail shelf space needed to display it in a package for sales. Furthermore, there is a need to produce a length-adjustable multi-segment clothes rod assembly that also permits the clothes rod assembly to be used with a variety of different vehicles, while being economical and easy to manufacture and install.

SUMMARY OF THE INVENTION

The present invention is an improvement over the prior clothes rods in that the way that the clothes rod assembly may be disassembled for storage, the size of the package needed for retail display of the clothes rod assembly, and the way that the clothes rod assembly may be used in a wide variety of vehicles, are unique and comprise improvements over the prior art. In particular, the adjustable clothes rod assembly of the present invention includes a pair of clothes rod segments that may be securely attached to one another through corresponding male and female bayonet-fit connecting members on the ends of the clothes rod segments, or other known means such as, but not limited to, threaded collars, snap-fit connectors and/or screw-together threaded ends. Each of the clothing rod segments comprises an outer sleeve or tube and an inner sleeve or tube that are sized to permit the inner sleeve to move in telescopic relation to the outer sleeve. The end of the inner sleeve includes a retaining end member for attaching the assembled clothes rod to the inside of a vehicle. In a preferred embodiment, the retaining end member includes both a loop and a hook for respectively attaching to a hook or a handle of a vehicle depending on which type is provided in that particular vehicle. Accordingly, the clothes rod assembly of the present invention may be used in any one of a plurality of different vehicles.

The inner sleeve also preferably may be selectively secured within the outer sleeve to maintain the clothes rod assembly in either telescoping or retracted position. The inner sleeve may be secured in relation to the outer sleeve so as to lock the sleeves relative to each other with respect to the longitudinal motion of one sleeve relative to the other sleeve in any of a variety of ways including, but not limited to, through the use of locking nuts; radially spring-loaded buttons and corresponding holes; or by twisting the inner sleeve.

In the latter example, the clothes rod assembly may comprise a cam sleeve that slips over the inner sleeve. In a first position, the cam sleeve does not engage the outer sleeve, whereby the inner sleeve may be slid inwardly or outwardly within the outer sleeve in a longitudinal direction to adjust the length of the clothes rod assembly. Rotation of the inner sleeve moves camming ramps located on the outside of the inner sleeve along corresponding camming ramps located on the inside of the cam sleeve, thereby pushing the cam sleeve into frictional engagement with the outer sleeve so as to prevent longitudinal motion of the sleeves, and therefore extension or retraction of the assembly. Rotation of the inner sleeve in the opposite direction disengages the cam sleeve from frictional engagement with the outer sleeve and permits the inner sleeve to slide within the outer sleeve in the longitudinal direction so as to permit extension or retraction of the assembly.

It is therefore an object of the present invention to provide a new and improved adjustable clothes rod assembly that is adjustable in the longitudinal or axial direction for carrying clothes within a variety of vehicle types and sizes.

A further object of the present invention is to provide an adjustable clothes rod assembly that may be disassembled into multiple segments for storage and/or display in packaged form in a reduced amount of storage or shelf space.

Another object of the present invention is to provide an adjustable clothes rod assembly that may be securely maintained in place in either an extended or retracted position.

Yet another object of the present invention is to provide an adjustable clothes rod assembly that permits the assembly to be used in a variety of different vehicles having different interior designs.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

FIG. 1 is a front elevated view of one embodiment of the present invention showing two clothing rod segments secured together.

FIG. 2 is a front elevated view of the embodiment of the present invention shown in FIG. 1 showing two clothing rod segments separated from one another.

DETAILED DESCRIPTION OF THE INVENTION

Figure 3:
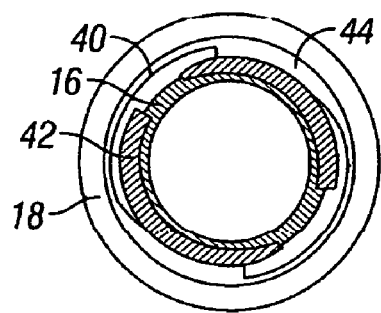
FIG. 3 is a cross-sectional view taken along line 3-3 of FIG. 1 and showing camming ramps of a cam sleeve and the inner sleeve of the first clothes rod segment.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Referring now to the drawings, and particularly to FIGS. 1 and 2, there is shown a preferred embodiment of the present invention. The clothes rod assembly of the present invention, generally designated by the number 10, is shown as having a first clothes rod segment 12 matingly connectable to a second clothes rod segment 14. Each of the clothes rod segments comprises an outer sleeve 16,17; an inner sleeve 18,19 that telescopically slips into and moves within the outer sleeve; a first or retaining end member 20,21 for attaching the clothes rod assembly to the vehicle; and a second end member 22,23 for connecting the first and second clothes rod segments 12,14 together.

Each of the outer sleeves 16,17 is preferably tubular and comprises an axial bore portion having a bore diameter. An additional sleeve, surface or coating 15 may be placed over part or all of the outer sleeves to provide a surface to inhibit movement of the hangers on the clothes rod assembly during use. Coating 15 can be textured to prevent undesired movement of the hangers. It is appreciated that the coating 15 may be a resilient rubber-like material and may be offered in a variety of colors to match or complement the color of the automotive interior in which it will be used.

The inner sleeve is preferably tubular having an inner diameter, and an outer diameter that is slightly smaller than the bore diameter of the outer sleeve to permit the inner sleeve 18,19 to slip into and move within the respective outer sleeve 16,17. Each of the inner sleeves 18,19 may be telescoped with respect to each other to adjust the overall length of the clothes rod assembly 10 by extending or retracting the inner sleeve 18,19. In particular, the length of each of the clothes rod segments 12,14, and therefore the clothes rod assembly 10, may be adjusted by selectively moving either or both of the inner sleeves 18,19 within their respective outer sleeves 16,17. Once the clothes rod segments 12,14 have been adjusted to the desired length, the inner sleeves 18,19 are preferably locked in place relative to the outer sleeve 16,17 by a retaining mechanism.

It is appreciated that the retaining mechanism may comprise any of the known mechanisms or means to selectively retain the inner sleeve in place relative to the outer sleeve. Preferably, each of the inner sleeves 18,19 may be selectively locked in place through the rotation of each of the sleeves 16 and 17 respectively. Referring to FIG. 3, one embodiment of a retaining mechanism is shown comprising a cam sleeve 40 and camming ramps 42,44. A cam sleeve 40 is preferably slipped over and fixed about each of the inner sleeves 18,19 such that they may selectively frictionally abut the inner walls of the outer sleeves 16 and 17 respectively. In a normal unlocked position, each inner sleeve 18,19 is permitted to travel within the respective axial bore of the outer sleeve 16,17. The inside of the cam sleeve 40 includes camming ramps 42 which are sized to be in sliding engagement with corresponding camming ramps 44 on the outside of the inner sleeve 18,19. As the inner sleeve 18,19 is turned, the camming ramps 42 will slide within the corresponding camming ramps 44 to push the cam sleeve 40 outward and into frictional engagement with the inside of the respective outer sleeve 16,17 so as to lock the inner sleeve 18,19 relative to the outer sleeve 16,17. Rotation of the inner sleeve 18,19 in the opposite direction (e.g., counter-clockwise) acts to disengage the cam sleeve 40 from frictional engagement with the outer sleeve 16,17 and permits the inner sleeve 18,19 to move axially within the respective outer sleeve 16,17 and thereby extend or retract longitudinally.

It is also appreciated that the sleeves may be locked relative to one another through a locking nut; a spring-loaded button attached to the inner sleeve for protrusion through one of a plurality of holes on the outer sleeve; a threaded collar engaging and tightening about a threaded end of the outer sleeve so as to tighten around and retain the inner sleeve; a snap or press-fit connection; or any other known means. The inner and outer sleeves may also comprise a substantially oblong cross-section, wherein the inner sleeve may be rotated to engage the inside of the outer sleeve to lock the inner sleeve relative to the outer sleeve. Furthermore, it is appreciated that the clothes rod segments may not comprise a retaining means.

Figure 4:
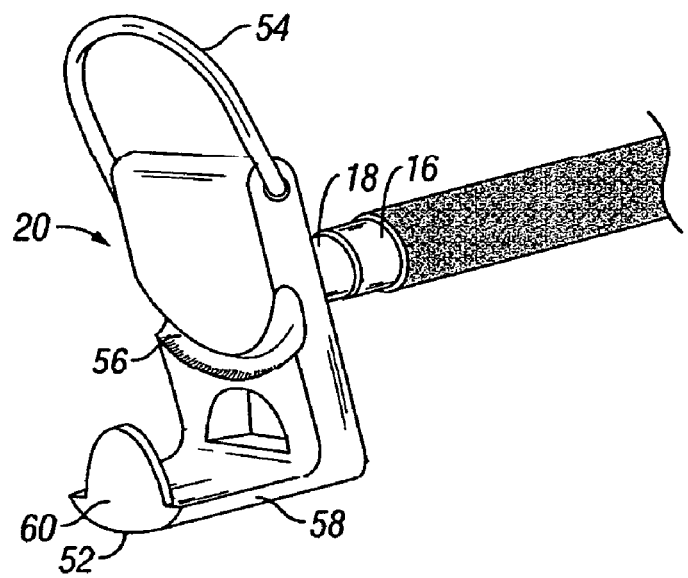
FIG. 4 is a perspective view of the end of one of the two clothing rod segments illustrating a hook and loop for attaching to a vehicle.

Referring now to FIG. 4, each of the first end members 20,21, preferably comprises a base 50, a hook 52 on one end of the base 50 and a loop 54 pivotally attached to the other end of the base 50. The loop 54 is designed such that it may be placed over a hook on a vehicle to secure the clothes rod assembly in place. The base 50 may also have a semi-circular slot 56 for receiving the loop 54 when the loop 54 is not in use. The hook 52 preferably comprises an arm 58 that extends outward from the base 50 and a retaining member 60 that extends downward from the arm 50 when in use. In operation, the hook 52 is placed over the handle or loop of the vehicle such that the handle contacts the arm 58. Once the hook 52 is placed over the handle, the retaining member 60 will act to prevent the hook 52 from being disengaged from the handle. While a hook having an arm and a retaining member is shown and disclosed, it is appreciated that the hook may be of a variety of sizes and shapes including, but not limited to, semi-circular and not depart from the scope of the present invention. Furthermore, while the retaining end members are shown and disclosed as having one hook and one loop, it is appreciated that the retaining end members may comprise two or more loops and/or two or more hooks and not depart from the scope of the present invention.

It is also appreciated that the first retaining end members 20,21 may be removably secured to the inner sleeves 18,19 in a known way, including through a press or snap fit; gluing; a screw or other fastener; a button and a hole; a pin; and the like, wherein the retaining end members may be removed and replaced depending on the type of structures located in the interior of a vehicle. While the retaining end members are shown and disclosed as being attached to or associated with the inner sleeves, it is appreciated that they may be attached to or associated with the outer sleeve and not depart from the scope of the present invention.

Figure 5:
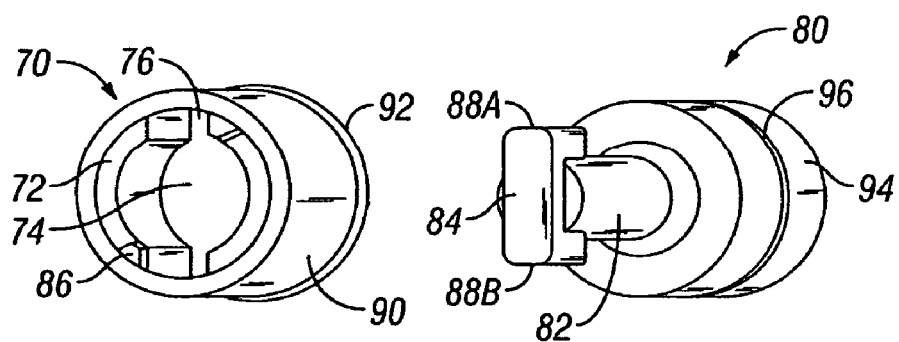
FIG. 5 is a perspective view of the male and female inserts of the two clothing rod segments that permit the two clothing rod segments to be connected together.
Figure 6:
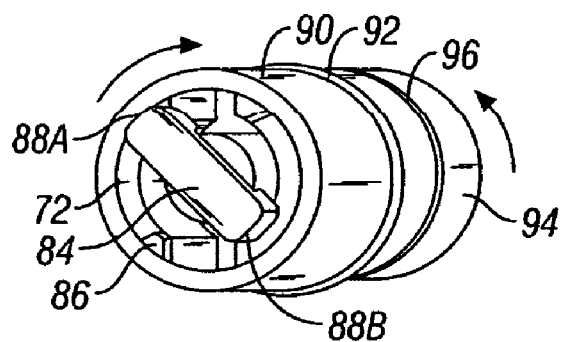
FIG. 6 is a perspective view showing the male and female inserts operatively connected together.

Referring now to FIGS. 5 and 6, one embodiment of the second end members 22,23 is shown for removably, yet securely, attaching the first and second clothes rod segments 12,14 together. The second end member 22 of the first clothes rod segment 12 comprises a female keyhole-shaped connecting member 70 having a hollow central bore and a pair of adjoining channel portions 72 that extend axially around the periphery of the bore at or near the end of the outer sleeve 16 to define a hole 74. The channel portions are preferably sized and located such that they communicate with the bore and provide two channels or slots 76 that extend beyond the periphery of the bore. While two channel portions are used to create two channels or slots 76, it is appreciated that any number of channel portions may be used to create any number of channels or slots about the central bore and not depart from the scope of the present invention.

The second end member 23 of the second clothes rod segment 14 preferably comprises a key-shaped male connecting member 80 having a base 82 and an end portion 84 with wings 88A and 88B attached thereto. In the preferred embodiment, the outer sleeve 17 comprises a connecting member 24 that is attached to the end of the outer sleeve 17 to define a connecting region for matingly connecting the male and female connecting members 70,80 together. The connecting member 24 preferably is sized such that its inner diameter is larger than the outer diameter of the outer sleeve 16 of the first clothes rod segment 12 to permit the second end member 22 of the first clothes rod segment 12 to be inserted into the connecting member 24 for attaching to the male connecting member 80. It is appreciated that the connecting member may be integral with the outer sleeve or a separate member that may be attached to the end of the outer sleeve in a known way including, but not limited to: through a threaded fastener that is tightened or loosened with a twisting motion; a threaded collar that connects the threaded adjoining outer ends of the outer sleeve and connecting member; spring-loaded axially extending buttons attached to the outer sleeve that are biased to extend through one or more holes in the connecting member; and the like. While the connecting member 24 is shown and disclosed as being attached to the outer sleeve 17 of the second clothes rod segment 14, it is appreciated that it may be attached to the inner sleeve and/or the first clothes rod segment 12 and not depart from the scope of the present invention.

The base 82 of the male connecting member 80 is sized such that it may pass within the hole 74 created by the two channel portions 72 of the female connecting member 70. The end portion 84 preferably extends across the base 82 such that its length is greater than the length of the hole 74 within the channel portions 72 but less than the diameter of the axial bore.

It is appreciated that the channel portions 72 may also include an axially extending member 86 for limiting the rotational movement of the male connecting member 80 relative to the female connecting member 70. The axially extending members are preferably located adjacent to one side of the channels or slots 76 to facilitate the mating and unmating of the male and female connecting members. Wings 88A and 88B are configured so as to enable passage of the end portion 84 of the male key-shaped member 80 through the corresponding channels 76.

As shown in FIGS. 5 and 6, the male and female connecting members 70,80 preferably comprise inserts that are selectively received within the ends of the outer sleeves 16,17 in a secure fashion. This can be accomplished by an interference or friction fit between the inserts and the interior walls of the segment ends. In the preferred embodiment, the male and female connecting members are sized such that they may be press or snap fit into the ends of the outer sleeves. Alternatively, the inserts can be held in place by gluing, screws, fasteners, threaded engagement or the like. The female connecting member 70 preferably comprises a cylindrical wall portion 90 that has a diameter that is slightly smaller than the inner diameter of the outer sleeve 16. A lip 92 at the end of the cylindrical wall portion 90 is preferably sized such that it extends over at least part of the outer sleeve 16, wherein when the female connecting member 70 is inserted into the outer sleeve 16, longitudinal movement of the female connecting member 70 into the outer sleeve 16 will be stopped when the lip 92 abuts with the outer sleeve 16.

The male connecting member 80 preferably comprises a cylindrical wall portion 94 that is slightly smaller than the inner diameter of the outer sleeve 17. A lip 96 preferably extends about the cylindrical wall portion 94 such that it extends over at least part of the outer sleeve 17, wherein when the male connecting member 80 is inserted into the outer sleeve 17, the longitudinal movement of the male connecting member 80 into the outer sleeve 17 will be stopped when the lip 96 abuts the outer sleeve 17. In the preferred embodiment, the male connecting member 80 is recessed within the connecting member 24 such that the connection between the male connecting member 80 and the female connecting member 70 occurs within the connecting region of the connecting member 24.

In operation, the male connecting member 80 is positioned such that the wings 88A and 88B of the ends 88 of the end portion 84 are aligned with the pair of channels 76 formed between the two channel portions 72 of the female connecting member 70. The male connecting member 80 is then inserted into the female connecting member 70 until the end portion 84 extends past the channel portions 72. The outer sleeve 16,17 of the first or second clothes rod segments 12,14 may thereafter be twisted or rotated until the wings 88A and 88B of the ends 88 of the end portion 84 are located beneath the channel portions 72, thereby selectively securing the two clothes rod segments 12,14 together. The male or female connecting member 70,80 may only be rotated until the ends 88A, 88B of the end portion 84 abut against or contact the axially extending members 86 so as to provide a bayonet-type connection that is not prone to undesired detachment when in use. When reversing the direction of rotation to unlock the clothes rod segment 12,14, rotation of the male connecting member 80 relative to the female connecting member 70 will be stopped when the wings 88A and 88B of the ends 88 of the end portion 84 are aligned with the channels or slots 76, thereby allowing the end portion 84 to be easily withdrawn in an axial direction from the female connecting member 70. In a preferred embodiment, the length of the base 82 to the bottom of the wings 88A and 88B is substantially equal to the depth of the channel portions 72 to inhibit any excess play or axial movement of the clothes rod segments 12,14 when attached.

While the female and male connecting members are shown and disclosed as being attached to or associated with the outer sleeves, it is appreciated that they may be attached to or associated with the inner sleeves and not depart from the scope of the present invention.

Figure 7:
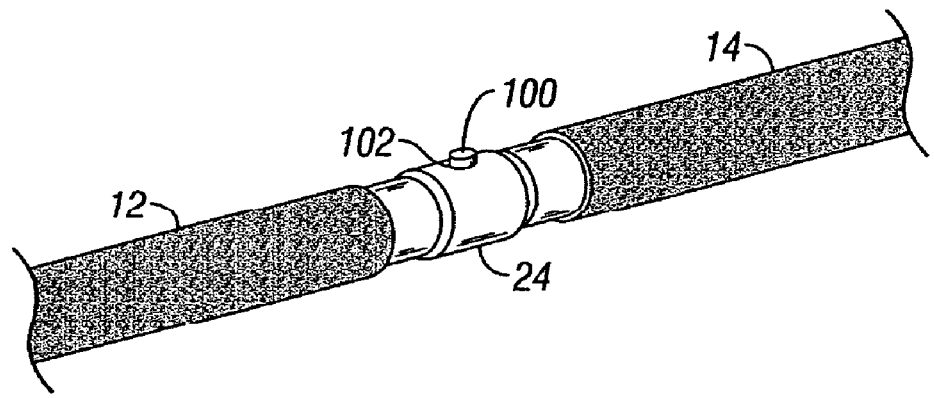
FIG. 7 is a perspective view of an alternate embodiment of the present invention illustrating the two clothing rod segments being connected together using a button and corresponding hole.
Figure 8:
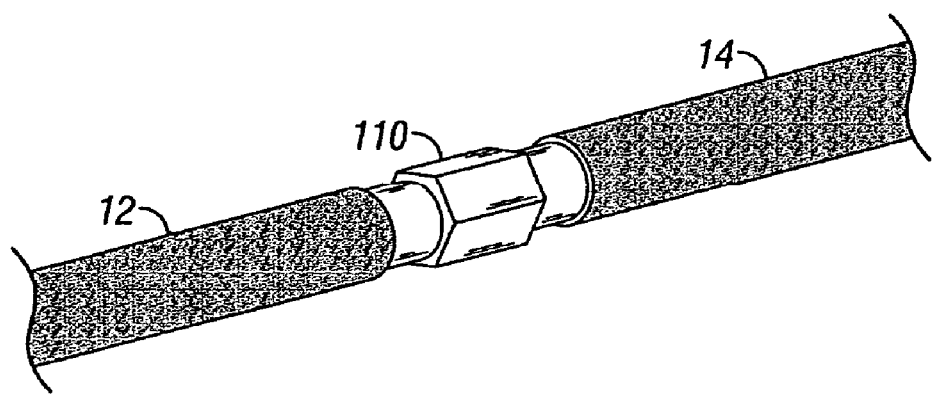
FIG. 8 is a perspective view of another embodiment of the present invention showing the two clothing rod segments being connected together using a locking or threaded collar.

While a male and female connecting member are shown and disclosed, it is appreciated that the two clothes rod segments may be connected together in any known means. For example, referring to FIG. 7, the clothes rod segments 12,14 may be attached together using a spring-loaded axially extending button or buttons 100 attached to one of the outer sleeves 16,17. The diameter of the outer sleeve having the button is preferably less than the inner diameter of the other outer sleeve or the connecting member 24 so that the outer sleeve having the button 100 may be inserted into the other outer sleeve or connecting member until the button 100 aligns with a corresponding hole 102 and is biased outward into the hole 102 to selectively lock the two clothes rod segments 12,14 together. Pressing the button 100 and pulling the two clothes rod segments apart in an axial direction allows the two clothes rod segments to be dissembled for storage. Referring now to FIG. 8, one end of a threaded fastener or collar 110 may be attached to one of the inner ends of the outer sleeves 16,17. The inner end of the other outer sleeve 16,17, which includes corresponding threads, may then be inserted into the other end of the threaded collar, and tightened or loosened with a twisting motion of the threaded collar 110 or outer sleeve 16,17. It is further appreciated that other known fastening means, including, but not limited to: screws and nut arrangements; cotter pins; snap or press-fit connections; and the like, may also be used and not depart from the scope of the present invention.

Because the clothes rod assembly may be disassembled into separate parts, the amount of space needed to store or display the clothes rod is significantly reduced, thereby making the product more appealing to distributors, merchants and consumers. Furthermore, while a pair of clothes rod segments are shown and disclosed, it is appreciated that the clothes rod assembly may comprise more than two clothes rod segments and not depart from the scope of the present invention.

It is further appreciated that the above-identified invention is applicable to any portable storage bars or rods including, but not limited to, shower curtain rods or closet bars.

It will be understood that modifications and variations may be effected without departing from the scope of the novel concepts of the present invention, but it is understood that this application is limited only by the scope of the appended claims.

The invention claimed is:

1. A multiple part adjustable clothes rod assembly for a vehicle comprising:
    a first clothes rod segment comprising:
        a first outer sleeve;
        a first inner sleeve movably received within the first outer sleeve for adjusting the length of the clothes rod assembly;
        means to attach the first clothes rod segment to the vehicle;
    a second clothes rod segment comprising:
        a second outer sleeve;
        a second inner sleeve movably received within the second outer sleeve for adjusting the length of the clothes rod assembly; and
        means to attach the second clothes rod segment to the vehicle; and
    means to removably attach the second clothes rod segment to the first clothes rod segment, the means to removably attach including a male member on the end of the first clothes rod segment and a female member on the end of the second clothes rod segment, wherein the male member may be selectively inserted into the female member and twisted to be locked in place in a bayonet-type connection, wherein the male member comprises a base having a first diameter and an end member having a pair of wings and a second diameter that is larger than the first diameter, and wherein the female member comprises a central bore having a pair of channels for receiving the wings of the end member.

2. The clothes rod assembly of claim 1 wherein the means to attach the first clothes rod segment to the vehicle and the means to attach the second clothes rod segment to the vehicle each comprise a retaining end member.

3. The clothes rod assembly of claim 2 wherein the retaining end member comprises a hook and a loop for attaching to a vehicle.

4. The clothes rod assembly of claim 1 wherein the female member further comprises a pair of axially extending members for limiting the rotation of the end member.

5. The clothes rod assembly of claim 1 wherein the end member is substantially T-shaped.

6. The clothes rod assembly of claim 1 which further comprises means to selectively secure each of the first and second inner sleeves in position relative to the respective first and second outer sleeves.

7. The clothes rod assembly of claim 6 wherein the means to selectively secure each of the first and second inner sleeves comprises a locking nut.

8. The clothes rod assembly of claim 6 wherein the means to selectively secure each of the first and second inner sleeves comprises an outwardly biased button on each of the first and second inner sleeve and a plurality of holes on the respective first and second outer sleeve for receiving the button.

9. The clothes rod assembly of claim 6 wherein each of the first and second inner sleeves comprises an outer surface having camming ramps and the means to selectively secure each of the first and second inner sleeves comprises a cam sleeve that is fixed about the inner sleeve, wherein the cam sleeve comprises camming ramps that slide within the camming ramps of the inner sleeve to selectively push the cam sleeve into engagement with the respective outer sleeve to prevent axial movement of the inner sleeve relative to the outer sleeve.

10. The clothes rod assembly of claim 9 wherein the each of the first and second inner sleeves comprises an outer surface having camming ramps and the means to selectively secure each of the inner sleeves comprises a cam sleeve that is fixed about the inner sleeve, wherein the cam sleeve comprises camming ramps that slide within the camming ramps of the inner sleeve to selectively push the cam sleeve into engagement with the respective outer sleeve to prevent axial movement of the inner sleeve relative to the outer sleeve.

11. An adjustable clothes rod assembly for a vehicle comprising:
    a first clothes rod segment comprising:
        a first sleeve assembly comprising a first outer sleeve and a first inner sleeve movably received within the first outer sleeve; and a first end member having a hook and a loop for attaching the clothes rod assembly to the vehicle;

a second clothes rod segment comprising:

a second sleeve assembly comprising a second outer sleeve and a second inner sleeve movably received within the second outer sleeve; and a second end member having a hook and a loop for attaching the clothes rod assembly to the vehicle; and means to removably attach the second clothes rod segment to the first clothes rod segment, the means to removably attach including a male member on the end of the first clothes rod segment and a female member on the end of the second clothes rod segment, wherein the male member may be selectively inserted into the female member and twisted to be locked in place in a bayonet-type connection, wherein the male member comprises a base having a first diameter and an end member having a pair of wings and a second diameter that is larger than the first diameter, and wherein the female member comprises a central bore having a pair of channels for receiving the wings of the end member.

12. The clothes rod assembly of claim 11 wherein the female member further comprises a pair of axially extending members for limiting the rotation of the end member.

13. The clothes rod assembly of claim 11 wherein the end member is substantially T-shaped.

\* \* \* \* \*